US012798591B2

(12) United States Patent
Yoshimura et al.

(10) Patent No.: US 12,798,591 B2
(45) Date of Patent: Nov. 17, 2026

(54) VEHICLE CONTROL DEVICE, VEHICLE CONTROL SYSTEM, AND VEHICLE CONTROL METHOD

(71) Applicant: Sony Semiconductor Solutions Corporation, Kanagawa (JP)

(72) Inventors: Shin Yoshimura, Tokyo (JP); Kazuto Hirose, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 300 days.

(21) Appl. No.: 18/727,972

(22) PCT Filed: Dec. 28, 2022

(86) PCT No.: PCT/JP2022/048670
§ 371 (c)(1),
(2) Date: Jul. 10, 2024

(87) PCT Pub. No.: WO2023/162474
PCT Pub. Date: Aug. 31, 2023

(65) Prior Publication Data

US 2026/0249864 A1 Aug. 27, 2026

(30) Foreign Application Priority Data

Feb. 24, 2022 (JP) ................................ 2022-026755

(51) Int. Cl.
*B60W 50/02* (2012.01)
*B60W 60/00* (2020.01)
(Continued)

(52) U.S. Cl.
CPC ........ *B60W 50/02* (2013.01); *B60W 60/0016* (2020.02); *G05D 1/2272* (2024.01); (Continued)

(58) Field of Classification Search
None
See application file for complete search history.

(56) References Cited

U.S. PATENT DOCUMENTS

2021/0163021 A1 6/2021 Frazzoli
2021/0284200 A1* 9/2021 Liu ...................... G05D 1/0077
(Continued)

FOREIGN PATENT DOCUMENTS

JP 2006023851 A 1/2006
JP 2016215900 A * 12/2016
(Continued)

OTHER PUBLICATIONS

International Search Report (PCT/ISA/210), International Application No. PCT/JP2022/048670, dated Mar. 20, 2023.

*Primary Examiner* — Peter D Nolan
*Assistant Examiner* — Jacob Kent Besteman-Street
(74) *Attorney, Agent, or Firm* — Michael Best & Friedrich LLP

(57) ABSTRACT

Vehicle control device that moves a vehicle to a safe place when a sensor used for automated driving fails is disclosed. In one example, sensors senses an area around the vehicle to generate sensing data. A travel control unit selectively executes automated driving that controls travel of the vehicle on the basis of the sensing data and remote driving that controls travel of the vehicle on the basis of operation information transmitted from an external device. In a case where it is determined that any of the sensors has failed during the automated driving, a communication control unit starts transmission of the sensing data (normal sensor data) of the sensors other than the sensor determined to have failed to the external device, or starts transmission of sensing data of the area around the vehicle generated on the basis of the sensing data (normal sensor data) to the external device.

15 Claims, 8 Drawing Sheets

(51) Int. Cl.

| | |
|---|---|
| ***G05D 1/227*** | (2024.01) |
| ***G05D 105/22*** | (2024.01) |
| ***G05D 107/13*** | (2024.01) |
| ***G05D 109/10*** | (2024.01) |

(52) U.S. Cl.

CPC ... *B60W 2420/403* (2013.01); *B60W 2520/10* (2013.01); *B60W 2720/106* (2013.01); *G05D 2105/22* (2024.01); *G05D 2107/13* (2024.01); *G05D 2109/10* (2024.01)

(56) References Cited

U.S. PATENT DOCUMENTS

| | | | | |
|---|---|---|---|---|
| 2022/0204006 | A1* | 6/2022 | Tsuji ............... | B60W 60/00186 |
| 2024/0239358 | A1* | 7/2024 | She ................... | B60W 50/0205 |

FOREIGN PATENT DOCUMENTS

| | | | | | |
|---|---|---|---|---|---|
| JP | 2020149323 | A | * | 9/2020 | ............. G06V 20/56 |
| JP | 2020166541 | A | * | 10/2020 | |
| KR | 102112684 | B1 | | 6/2020 | |

* cited by examiner

VEHICLE CONTROL DEVICE, VEHICLE CONTROL SYSTEM, AND VEHICLE CONTROL METHOD

TECHNICAL FIELD

The present disclosure relates to a vehicle control device, a vehicle control system, and a vehicle control method.

BACKGROUND ART

Conventionally, there has been proposed a vehicle failure notification device that is mounted on a vehicle, detects a failure of an electronic component in the vehicle, and notifies information notifying a location or a degree of the failure to a notification destination (an emergency center, a support sensor, a normal call center, or the like) according to characteristics of the failure (see, for example, Patent Document 1).

CITATION LIST

Patent Document

Patent Document 1: Japanese Patent Application Laid-Open No. 2006-23851

SUMMARY OF THE INVENTION

Problems to be Solved by the Invention

However, Patent Document 1 does not disclose a configuration that enables the vehicle to move to a safe place in the case where a sensor used for automated driving fails during the automated driving.

An object of the present disclosure is to provide a vehicle control device, a vehicle control system, and a vehicle control method capable of moving a vehicle to a safe place in a case where a sensor used for automated driving fails during the automated driving.

Solutions to Problems

A vehicle control device of the present disclosure includes (a) a plurality of sensors mounted on a vehicle and configured to sense an area around the vehicle to generate sensing data, (b) a travel control unit mounted on the vehicle and configured to selectively execute automated driving that controls travel of the vehicle on a basis of the sensing data of the plurality of sensors and remote driving that controls travel of the vehicle on a basis of operation information related to the remote driving of the vehicle transmitted from an external device, and (c) a communication control unit mounted on the vehicle, and configured to, in a case where it is determined that any of the plurality of sensors has failed during the automated driving, start transmission of the sensing data of the sensor other than the sensor determined to have failed to the external device, or start transmission of sensing data of the area around the vehicle generated on a basis of the sensing data to the external device.

A vehicle control system of the present disclosure includes (a) a vehicle control device mounted on a vehicle, and (b) an external device disposed outside the vehicle, the vehicle control device including (c) a plurality of sensors configured to sense an area around the vehicle to generate sensing data, (d) a travel control unit configured to selectively execute automated driving that controls travel of the vehicle on a basis of the sensing data of the plurality of sensors and remote driving that controls travel of the vehicle on a basis of operation information related to the remote driving of the vehicle transmitted from the external device, and (e) a communication control unit configured to, in a case where it is determined that any of the plurality of sensors has failed during the automated driving, start transmission of the sensing data of the sensor other than the sensor determined to have failed to the external device, or start transmission of sensing data of the area around the vehicle generated on a basis of the sensing data to the external device, and the external device including (f) a display unit configured to display an image related to an area around the vehicle on a basis of the sensing data, and (g) a remote operation unit configured to receive an operation by a remote driver, generate the operation information according to the received operation, and transmit the operation information to the external device.

A vehicle control method of the present disclosure includes (a) selectively executing automated driving that controls travel of a vehicle on a basis of sensing data generated by a plurality of sensors mounted on the vehicle or remote driving that controls travel of the vehicle on a basis of operation information related to the remote driving of the vehicle transmitted from an external device, and (b) in a case where it is determined that any of the plurality of sensors mounted on the vehicle has failed during the automated driving, starting transmission of the sensing data of the sensor other than the sensor determined to have failed to the external device, or starting transmission of sensing data of the area around the vehicle generated on a basis of the sensing data to the external device.

MODE FOR CARRYING OUT THE INVENTION

Hereinafter, an example of a vehicle control device, a vehicle control system, and a vehicle control method according to an embodiment of the present disclosure will be described with reference to FIGS. 1 to 10. Embodiments of the present disclosure will be described in the following order. Note that, the present disclosure is not limited to the following examples.

Furthermore, the effects described in the present specification are illustrative and not restrictive, and there may be additional effects.

1. First Embodiment
    1-1 Vehicle Control System
    1-2 Processing Upon Failure
2. Second Embodiment 1. First Embodiment

[1-1 Vehicle Control System]

Figure 1:
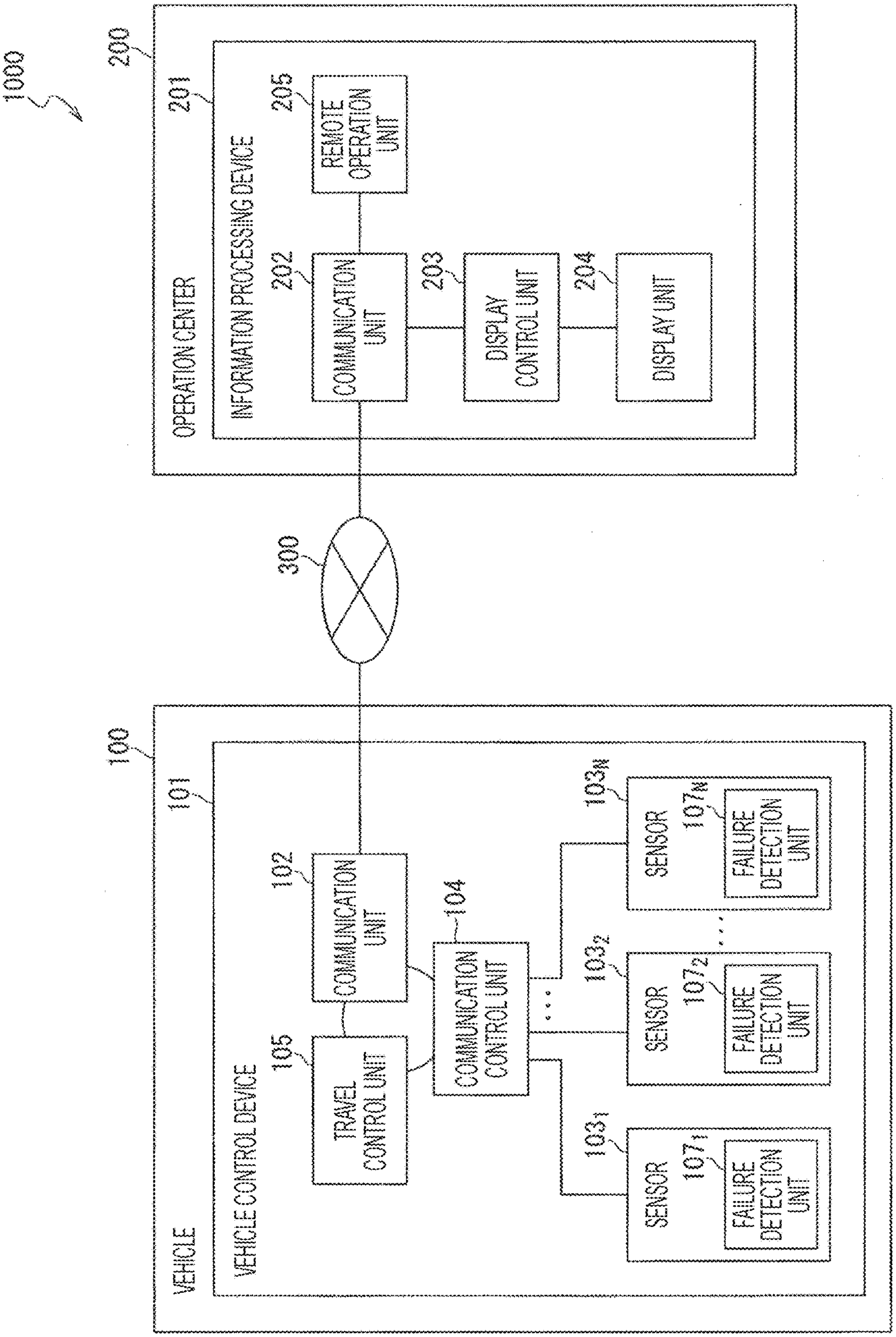
FIG. 1 is a diagram illustrating an overall configuration of a vehicle control system according to a first embodiment.

A vehicle control system 1000 according to a first embodiment of the present disclosure will be described. FIG. 1 is a diagram illustrating an overall configuration of the vehicle control system 1000 according to the first embodiment. The vehicle control system 1000 is a system in which, in a case where it is determined that any of sensors has failed during automated driving, a vehicle side transmits sensing data of a sensor other than the sensor determined to have failed to an external device (hereinafter, also referred to as an "information processing device"), and the information processing device side presents the transmitted sensing data to an operator and causes the operator perform remote driving of the vehicle. Therefore, the vehicle can be moved to a safe place by the remote driving of the operator.

As illustrated in FIG. 1, the vehicle control system 1000 includes a vehicle control device 101 mounted on a vehicle 100 and an information processing device 201 installed in an operation center 200. The vehicle control device 101 and the information processing device 201 are wirelessly connected via a network 300. An example of the network 300 includes the Internet using a communication protocol such as TCP/IP.

The vehicle 100 on which the vehicle control device 101 is mounted is a moving object capable of automated driving based on sensing data obtained by sensing an area around the vehicle and remote driving by a remote operator. A person may or may not be on the vehicle 100.

The vehicle control device 101 includes a communication unit 102, a plurality of sensors $\mathbf{103}_1$, $\mathbf{103}_2$, . . . , and $\mathbf{103}_N$ (N is a numerical value of 2 or more), a communication control unit 104, and a travel control unit 105.

The communication unit 102 wirelessly communicates with the external device such as the information processing device 201 via the network 300. Furthermore, communication of the communication unit 102 is controlled by the communication control unit 104. An example of the communication unit 102 includes a combination of a communication antenna and an RF circuit.

As illustrated in FIGS. 2, 3, 4, and 5, the sensors $\mathbf{103}_1$, $\mathbf{103}_2$, . . . , and $\mathbf{103}_N$ sense the area around the vehicle 100 to generate the sensing data. As the sensors $\mathbf{103}_1$, $\mathbf{103}_2$, . . . , and $\mathbf{103}_N$, for example, a camera, a millimeter wave radar, or light detection and ranging (LiDAR) can be adopted. An example of the camera includes a camera that includes an image sensor and a distance image sensor, and captures an image of the area (front, side, or rear) around the vehicle 100 to generate image data. The sensing data (image data) is output to the communication control unit 104.

Figure 2:
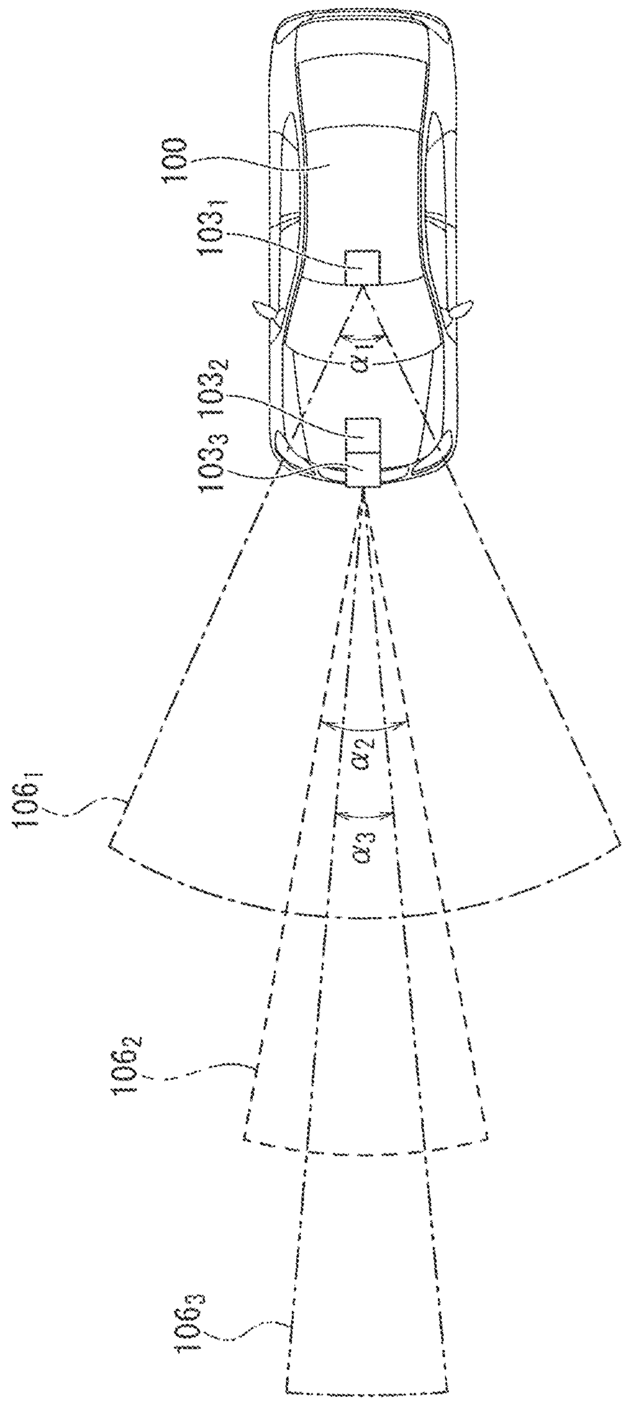
FIG. 2 is a diagram illustrating an example of a sensor.

FIG. 2 exemplifies a case where the sensors $\mathbf{103}_1$, $\mathbf{103}_2$, and $\mathbf{103}_3$ include two or more cameras $\mathbf{103}_1$, $\mathbf{103}_2$, and $\mathbf{103}_3$ having different angles of view $\alpha_3$, $\alpha_2$, and $\alpha_3$ and capturing images in the same direction to generate the image data (sensing data). Specifically, the camera $\mathbf{103}_1$ is a front camera that is disposed near an upper portion of a windshield of the vehicle 100, has the first angle of view $\alpha_1$, and captures an image of the front of the vehicle 100. Furthermore, the camera $\mathbf{103}_2$ is a front camera that is disposed near a front grille of the vehicle 100, has the second angle of view $\alpha_2$ narrower than the first angle of view $\alpha_1$, and captures an image of the front of the vehicle 100. Furthermore, the camera $\mathbf{103}_3$ is a front camera that is disposed near the front grille of the vehicle 100, has the third angle of view $\alpha_3$ narrower than the second angle of view $\alpha_2$, and captures an image of the front of the vehicle 100. Furthermore, the cameras $\mathbf{103}_1$, $\mathbf{103}_2$, and $\mathbf{103}_3$ are located on a straight line passing through a center portion in a vehicle width direction and extending along a vehicle front-rear direction in plan view. Therefore, areas on the center portion side in the vehicle width direction of an imaging range $\mathbf{106}_1$ of the camera $\mathbf{103}_1$, an imaging range $\mathbf{106}_2$ of the camera $\mathbf{103}_2$, and an imaging range $\mathbf{106}_3$ of the camera $\mathbf{103}_3$ overlap each other. That is, the imaging ranges $\mathbf{106}_1$, $\mathbf{106}_2$, and $\mathbf{106}_3$ partially overlap each other.

Note that the imaging ranges $\mathbf{106}_1$, $\mathbf{106}_2$, and $\mathbf{106}_3$ illustrated in FIG. 2 are given for indicating the first to third angles of view $\alpha_1$, $\alpha_2$, and $\alpha_3$. Therefore, ends (hereinafter, also referred to as "far-side ends") of the imaging ranges $\mathbf{106}_1$, $\mathbf{106}_2$, and $\mathbf{106}_3$ illustrated in FIG. 2 on a side far from the vehicle 100 are located relatively close to the vehicle 100 for convenience of drawing. However, in practice, the far-side ends are located sufficiently far from the vehicle 100, and the imaging ranges $\mathbf{106}_1$, $\mathbf{106}_2$, and $\mathbf{106}_3$ sufficiently overlap each other. Furthermore, the same similarly applies to imaging ranges $\mathbf{106}_4$, $\mathbf{106}_5$, $\mathbf{106}_6$, $\mathbf{106}_7$, $\mathbf{106}_8$, $\mathbf{106}_9$, $\mathbf{106}_{10}$, and $\mathbf{106}_{11}$ illustrated in FIGS. 3, 4, and 5.

Figure 3:
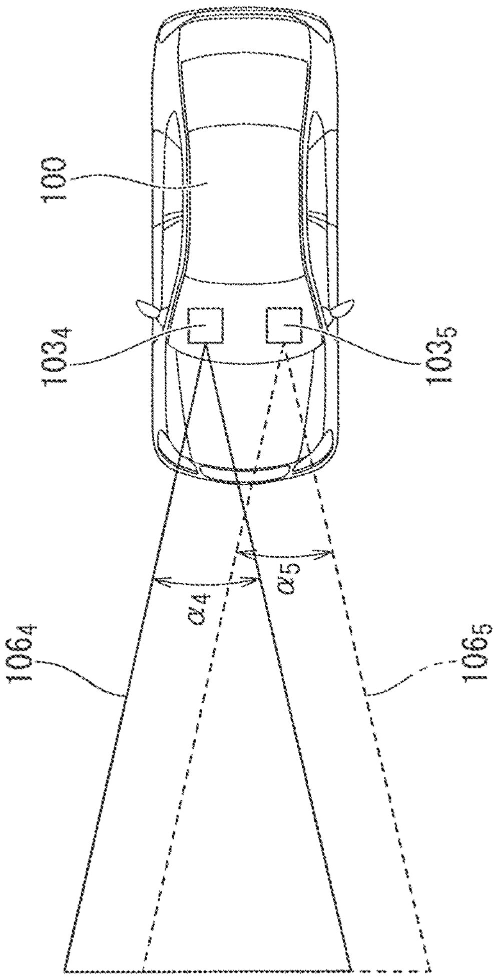
FIG. 3 is a diagram illustrating an example of a sensor.

FIG. 3 exemplifies a case where sensors $\mathbf{103}_4$ and $\mathbf{103}_5$ include two cameras $\mathbf{103}_4$ and $\mathbf{103}_5$ having angles of view $\alpha_4$ and $\alpha_5$ that are the same and capturing images in the same direction to generate the image data (sensing data). Specifically, the camera $\mathbf{103}_4$ is a front camera that is disposed near a lower portion of the windshield of the vehicle 100, has the fourth angle of view $\alpha_4$, and captures an image of the front of the vehicle 100. Furthermore, the camera $\mathbf{103}_5$ is a front camera that is disposed near a lower portion of the windshield of the vehicle 100, has the fifth angle of view $\alpha_5$ (=($\alpha_4$) equal to the fourth angle of view $\alpha_4$, and captures an image of the front of the vehicle 100. Furthermore, the camera $\mathbf{103}_4$ and the camera $\mathbf{103}_5$ are arranged side by side at close positions in the vehicle width direction in plan view. Therefore, most of areas of the imaging range $\mathbf{106}_4$ of the camera $\mathbf{103}_4$ and the imaging range $\mathbf{106}_4$ of the camera $\mathbf{103}_4$ overlap each other. That is, the imaging ranges $\mathbf{106}_4$ and $\mathbf{106}_4$ partially overlap each other. As the camera $\mathbf{103}_4$ and the camera $\mathbf{103}_5$, for example, two monocular cameras constituting a redundant system in which one serves as the other's reserve device can be adopted. Furthermore, for example, a stereo camera can be adopted.

Figure 4:
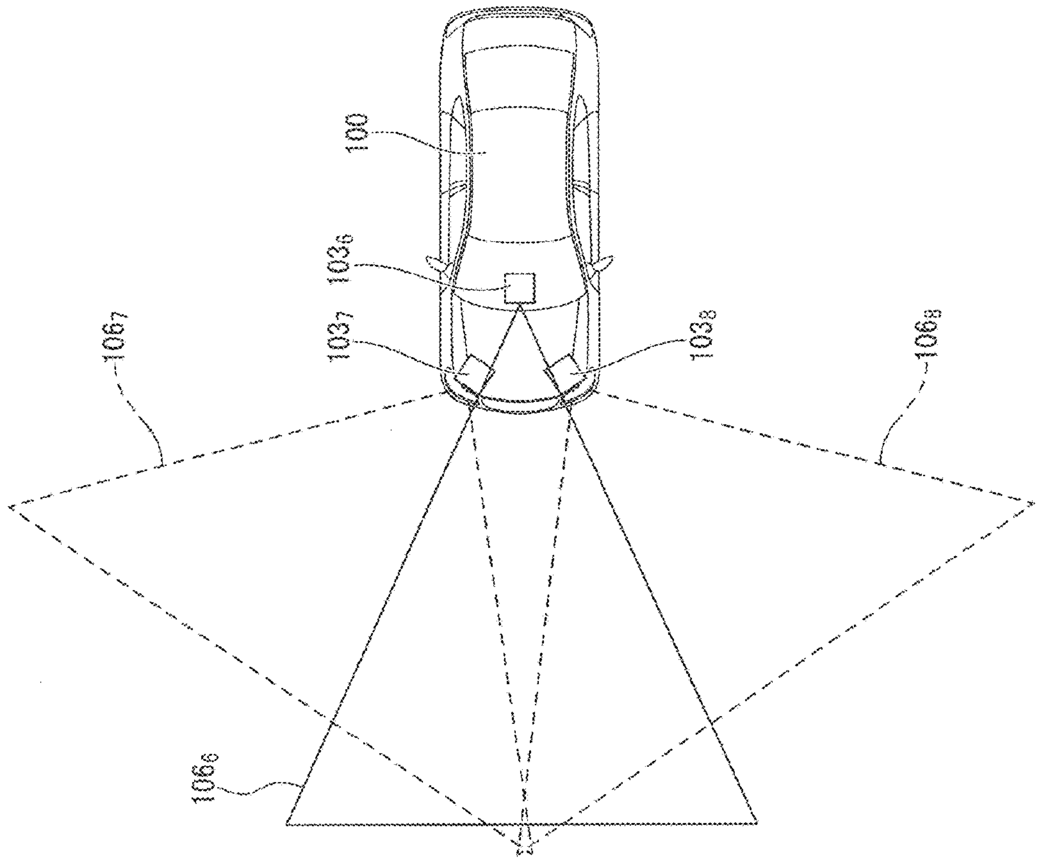
FIG. 4 is a diagram illustrating an example of a sensor.

FIG. 4 illustrates a case where sensors $\mathbf{103}_6$, $\mathbf{103}_7$, and $\mathbf{103}_8$ include a front camera $\mathbf{103}_6$, a diagonally right front camera $\mathbf{103}_7$, and a diagonally left front camera $\mathbf{103}_8$ that capture images in different directions to generate the image data (sensing data). Specifically, the front camera $\mathbf{103}_6$ is disposed near a lower portion of the windshield of the vehicle 100 and captures an image of the front of the vehicle 100. Furthermore, the diagonally right front camera $\mathbf{103}_7$ is disposed near a diagonally right front end of the vehicle 100, and captures an image of the diagonally right front of the vehicle 100. Furthermore, the diagonally left front camera $\mathbf{103}_8$ is disposed near a diagonally left front end of the vehicle 100, and captures an image of the diagonally left front of the vehicle 100. Furthermore, areas on the end side of the imaging range $\mathbf{106}_7$ of the diagonally right front camera $\mathbf{103}_7$ and the imaging range $\mathbf{106}_8$ of the diagonally left front camera $\mathbf{103}_8$ overlaps the imaging range $\mathbf{106}_6$ of the front camera $\mathbf{103}_6$. That is, the imaging ranges $\mathbf{106}_7$ and $\mathbf{106}_8$ partially overlap the imaging range $\mathbf{106}_6$.

Figure 5:
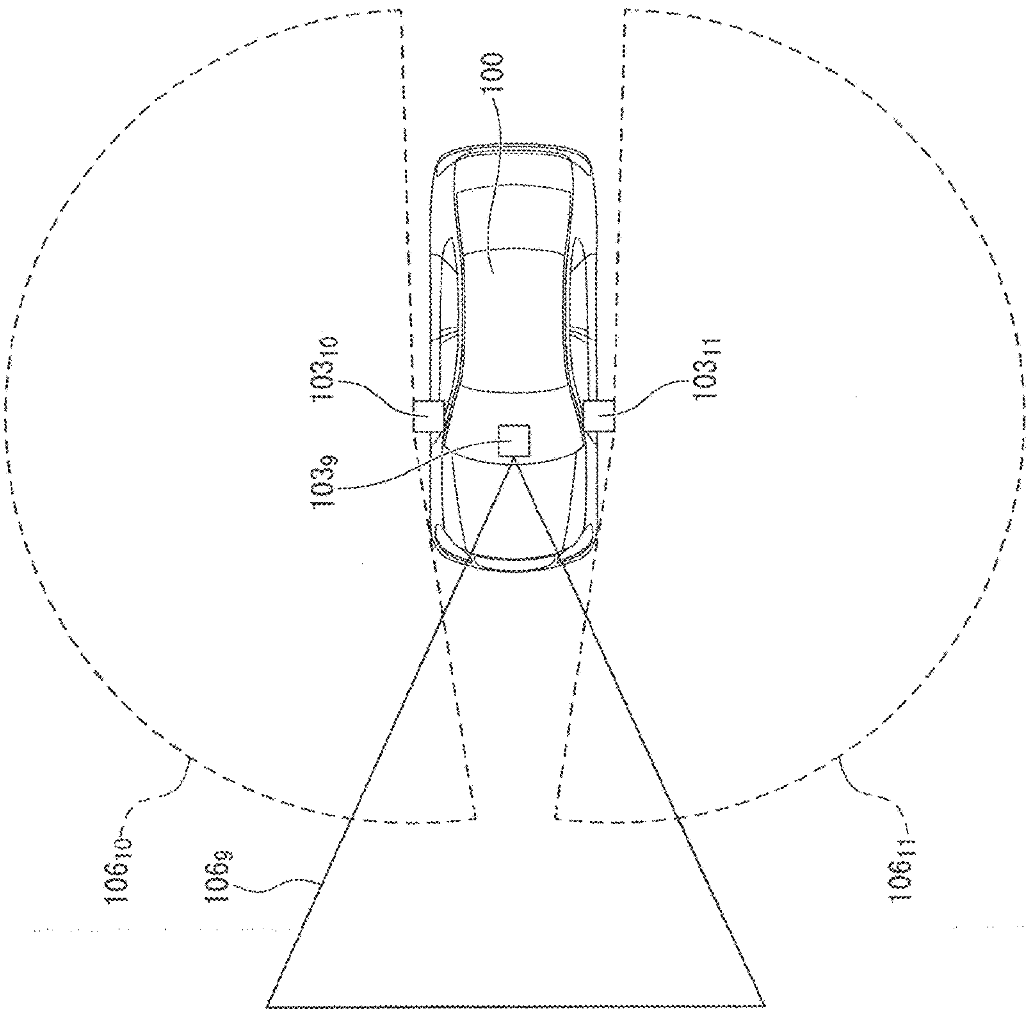
FIG. 5 is a diagram illustrating an example of a sensor.

FIG. 5 illustrates a case where sensors $\mathbf{103}_9$, $\mathbf{103}_{10}$, and $\mathbf{103}_{11}$ include a front camera $\mathbf{103}_9$, a right side camera $\mathbf{103}_{10}$, and a left side camera $\mathbf{103}_{11}$ that capture images in different directions to generate the image data (sensing data). Specifically, the front camera $\mathbf{103}_{10}$ is disposed near a lower portion of the windshield of the vehicle 100 and captures an image of the front of the vehicle 100. Furthermore, the right side camera $\mathbf{103}_{10}$ is disposed near a right-side door mirror of the vehicle 100, and captures an image of a right side of the vehicle 100. Furthermore, the left side camera $\mathbf{103}_{11}$ is disposed near a left-side door mirror of the vehicle 100, and captures an image of a left side of the vehicle 100. Furthermore, areas on the end side of the imaging range $\mathbf{106}_{10}$ of the right side camera $\mathbf{103}_{10}$ and the imaging range $\mathbf{106}_{11}$ of the left side camera $\mathbf{103}_{1}$ overlaps the imaging range $\mathbf{106}_{9}$ of the front camera $\mathbf{103}_{9}$. That is, the imaging ranges $\mathbf{106}_{10}$ and $\mathbf{106}_{1}$ partially overlap the imaging range $\mathbf{106}_{9}$.

Furthermore, the sensors $\mathbf{103}_{1}$, $\mathbf{103}_{2}$, . . . , and $\mathbf{103}_{N}$ include failure detection units $\mathbf{107}_{1}$, $\mathbf{107}_{2}$, . . . , and $\mathbf{107}_{N}$. The failure detection units $\mathbf{107}_{1}$, $\mathbf{107}_{2}$, . . . , and $\mathbf{107}_{N}$ detect failures of the sensors $\mathbf{103}_{1}$, $\mathbf{103}_{2}$, . . . , and $\mathbf{103}_{N}$. For example, in the case where the sensor is the camera, the failure detection unit determines whether or not there is a missing pixel in the obtained image, and in a case where it is determined that there is a missing pixel, the failure detection unit determines that the sensor has failed. A detection result (hereinafter, also referred to as a "failure determination signal") is output to the communication control unit 104.

Figure 6:
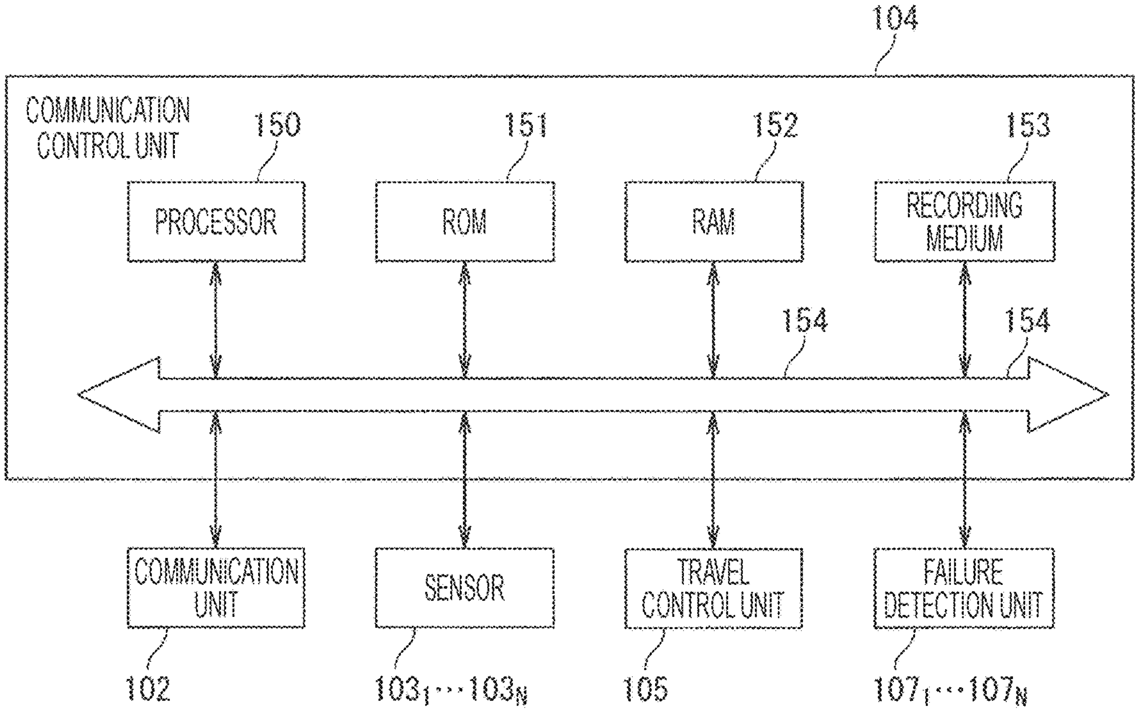
FIG. 6 is a diagram illustrating an internal configuration of a communication control unit.

As illustrated in FIG. 6, the communication control unit 104 includes a processor 150, a ROM 151, a RAM 152, and a recording medium 153. Furthermore, in the vehicle control device 101, the components are connected to each other via a bus 154 as a transmission path for data or the like.

The processor 150 includes, for example, one or more processors including an arithmetic circuit such as a micro processing unit (MPU), various processing circuits, and the like, and controls the entire vehicle 100. Furthermore, the processor 150 functions as the vehicle control device 101 that performs processing (hereinafter, also referred to as "processing upon failure") related to a vehicle control method according to the first embodiment together with the travel control unit 105. Note that the processing related to the vehicle control method may be performed by a dedicated circuit (for example, a processor separate from the processor 150) or a general-purpose circuit capable of realizing the processing upon failure.

The ROM 151 stores control data such as programs and operation parameters used by the processor 150. Furthermore, the RAM 152 temporarily stores programs and the like executed by the processor 150. Furthermore, the recording medium 153 stores, for example, data, various applications, and the like related to the processing upon failure to be described below. Examples of the recording medium 153 include a magnetic recording medium such as a hard disk, and a nonvolatile memory such as a flash memory. Note that the recording medium 153 may be detachable from the vehicle control device 101.

The travel control unit 105 can selectively execute automated driving, remote driving, and deceleration control of the vehicle 100. In the automated driving, the travel control unit 105 controls the travel of the vehicle 100 on the basis of the sensing data of the plurality of sensors $\mathbf{103}_{1}$, $\mathbf{103}_{2}$, . . . , and $\mathbf{103}_{N}$. For example, the travel control unit 105 controls a driving force, a braking/driving force, a steering angle, and the like of wheels so that the vehicle 100 travels following a preceding vehicle while maintaining a lane. Furthermore, in the remote driving, the travel control unit 105 controls the travel of the vehicle 100 on the basis of operation information (hereinafter, also referred to as a "vehicle control signal") regarding the remote driving of the vehicle 100 transmitted from the information processing device 201. For example, the travel control unit 105 controls the driving force, the braking/driving force, the steering angle, and the like of the wheels so that the vehicle 100 travels according to the remote driving by a remote driver. Furthermore, in the deceleration control, the travel control unit 105 decelerates the vehicle 100. For example, the travel control unit 105 controls the driving force, the braking/driving force, the steering angle, and the like of the wheels on the basis of the sensing data of the plurality of sensors $\mathbf{103}_{1}$, $\mathbf{103}_{2}$, . . . , and $\mathbf{103}_{N}$ so that the vehicle 100 safely decelerates and stops.

Furthermore, as will be described below, the travel control unit 105 executes the processing upon failure together with the communication control unit 104, and switches the automated driving to the remote driving or the deceleration control by the processing upon failure.

Returning to FIG. 1, the operation center 200 in which the information processing device 201 is disposed is a data center in which the operator who performs the remote driving of the vehicle 100 at the time of sensor failure is resident.

Figure 7:
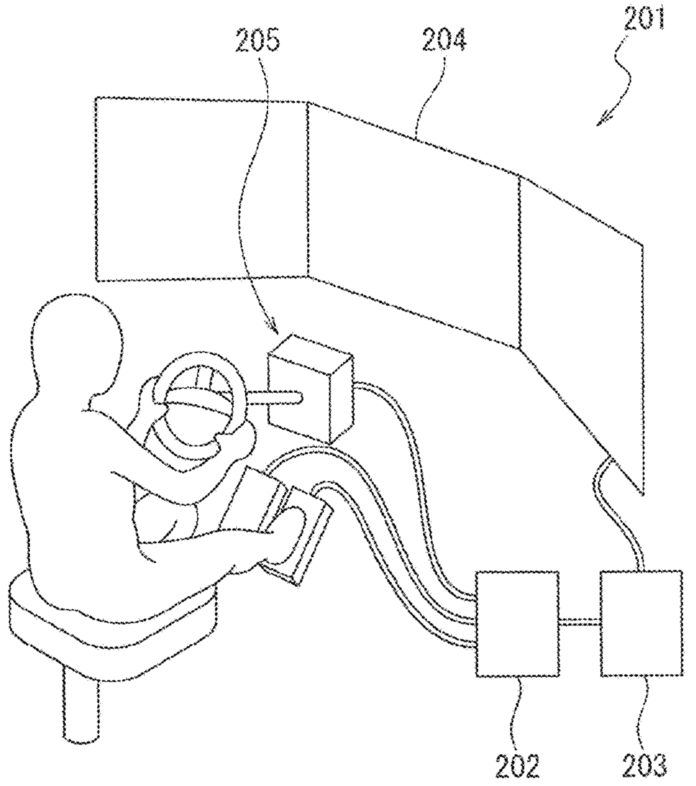
FIG. 7 is a diagram illustrating an overall configuration of an information processing device.

As illustrated in FIGS. 1 and 7, the information processing device 201 includes a communication unit 202, a display control unit 203, a display unit 204, and a remote operation unit 205.

The communication unit 202 wirelessly communicates with the vehicle control device 101 of the vehicle 100 via the network 300. Furthermore, communication of the communication unit 202 is controlled by the remote operation unit 205. An example of the communication unit 202 includes a combination of a communication antenna and an RF circuit.

The display control unit 203 receives the sensing data from the vehicle control device 101 via the communication unit 202, and causes the display unit 204 to display a sensing result indicated by the received sensing data. FIG. 7 illustrates a case where three liquid crystal displays (multi-displays) are used as the display unit 204. In the case where three liquid crystal displays are used, for example, the image data of the camera that captures an image of the front of the vehicle is displayed on the central liquid crystal display, furthermore, the image data of the camera that captures an image of the left side of the vehicle is displayed on the left liquid crystal display, and moreover, the image data of the camera that captures an image of the right side of the vehicle is displayed on the right liquid crystal display.

The remote operation unit 205 is a controller imitating an accelerator pedal, a brake pedal, and a steering wheel. Then, the remote operation unit 205 receives an operation by the operator (remote driver), generates the operation information (vehicle control signal) according to the received operation, and transmits the operation information to the communication control unit 104 of the vehicle 100 via the communication unit 202 and the network 300.

[1-2 Processing Upon Failure]

Next, the processing upon failure executed by the communication control unit 104 and the travel control unit 105 will be described. The processing upon failure is executed when the travel control unit 105 starts the automated driving. Note that, during the execution of the processing upon failure, the automated driving is continued until the remote driving or the deceleration control is started.

Figure 8:
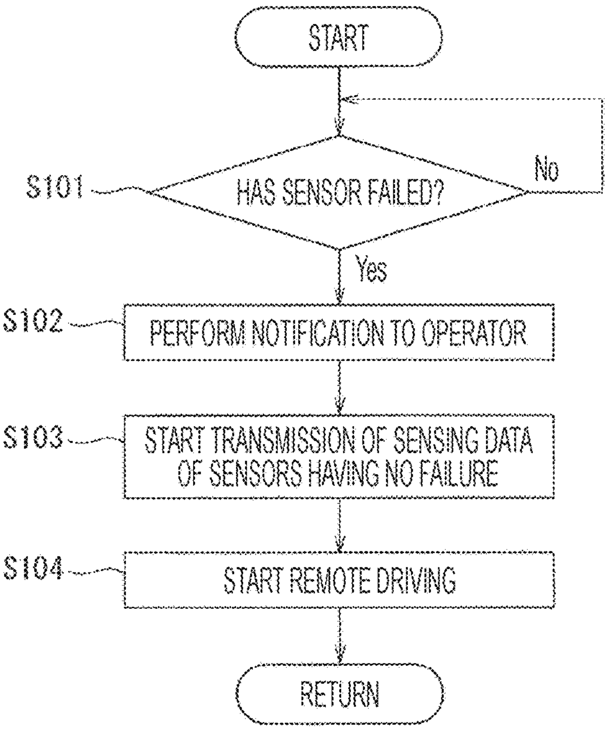
FIG. 8 is a diagram illustrating a flowchart of processing upon failure.

In the processing upon failure, as illustrated in FIG. 8, first, in step S101, the communication control unit 104 acquires the failure determination signals transmitted from the failure detection units $\mathbf{107}_{1}$, $\mathbf{107}_{2}$, . . . , and $\mathbf{107}_{N}$. Next, it is determined whether or not any of the plurality of sensors $\mathbf{103}_{1}$, $\mathbf{103}_{2}$, . . . , and $\mathbf{103}_{N}$ has failed on the basis of the acquired failure determination signals. Then, in a case where it is determined that any of the sensors has failed (Yes), the processing proceeds to step S102. On the other hand, in a case where it is determined that none of the sensors has failed (No), this determination is executed again.

Figure 9:
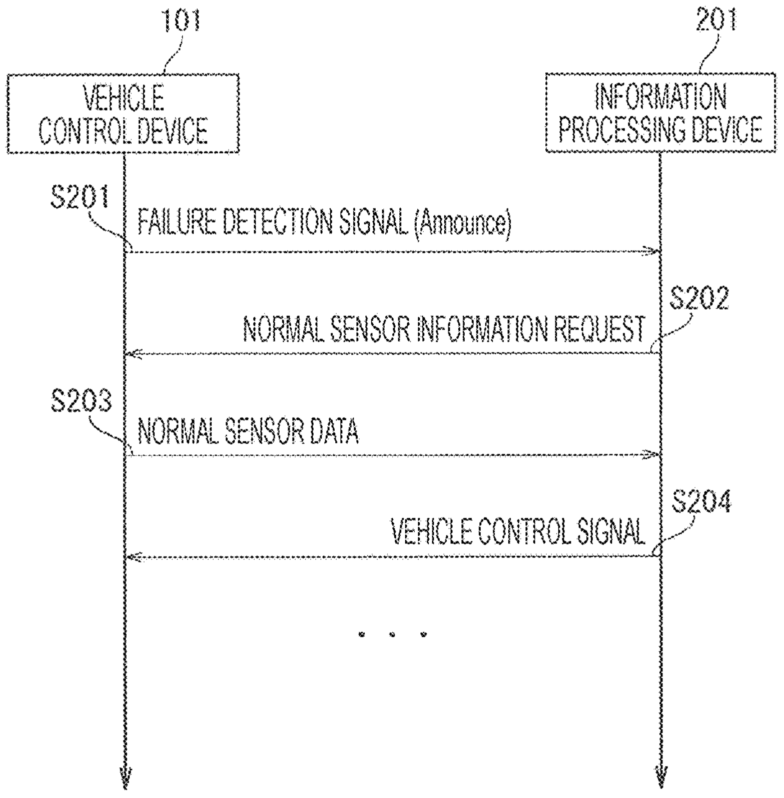
FIG. 9 is a diagram illustrating communication in a vehicle control system.

In step S102, the communication control unit 104 transmits a failure detection signal notifying that a failure has been detected to the information processing device 201 of the operation center 200 via the communication unit 102 and the network 300 ("failure detection signal (Announce)" in S201 of FIG. 9). Therefore, the display control unit 203 of the information processing device 201 receives the failure detection signal via the communication unit 202. Then, the display control unit 203 transmits a failure detection reception acknowledgment signal and a normal sensor information request signal to the communication control unit 104 that is a transmission source of the failure detection signal via the communication unit 202 and the network 300 ("normal sensor information request" in S202 of FIG. 9).

Next, the processing proceeds to step S103, and the communication control unit 104 waits until receiving the normal sensor information request signal from the information processing device 201. Then, when having received the normal sensor information request signal, the communication control unit 104 transmits the sensing data (hereinafter, also referred to as "normal sensor data") of the sensors 103$_1$, . . . , 103$_{i-1}$, 103$_{i+1}$, . . . , and 103$_N$ other than the sensor 103$_i$ (i is any one of 1 to N) determined to have failed in step S101 among the sensors 103$_1$, 103$_2$, . . . , and 103$_N$ to the information processing device 201 of the operation center 200 via the communication unit 102 and the network 300 ("normal sensor data" in step S203 in FIG. 9). The transmission of the normal sensor data is continued until the remote driving is started. That is, the communication control unit 104 starts the transmission of the sensing data of the sensors other than the sensor determined to have failed to the information processing device 201. Note that it may be configured to start the transmission of the sensing data of the area around the vehicle 100 generated on the basis of the normal sensor data (the sensing data of the sensors other than the sensor determined to have failed) instead of the normal sensor data.

Thereby, the display control unit 203 of the information processing device 201 receives the sensing data via the communication unit 202, causes the display unit 204 to display the sensing result indicated by the received sensing data, and provides the operator of the information processing device 201 with a situation of the area around the vehicle 100.

Furthermore, the operator operates the remote operation unit 205 so that the vehicle 100 moves to a safe place such as a roadside strip on the basis of the situation of the area around the vehicle 100 provided from the display unit 204. Then, the remote operation unit 205 transmits the operation information (vehicle control signal) related to the remote driving of the vehicle 100 to the communication control unit 104 as a transmission source of the sensing data via the communication unit 202 and the network 300 ("vehicle control signal" in S204 of FIG. 9).

For example, in a case where two or more cameras (in FIG. 2, the three cameras 103$_1$, 103$_2$, and 103$_3$) illustrated in FIG. 2 are included as the sensors 103$_1$, 103$_2$, and 103$_3$, the communication control unit 104 performs control to transmit the sensing data including the image data of the remaining cameras to the information processing device 201 in a case where it is determined that any of the two or more cameras 103$_1$, 103$_2$, and 103$_3$ has failed. Therefore, even if one camera that captures an image of the front of the vehicle 100 fails, the display unit 204 can display an image of the front of the vehicle 100 on the display unit 204.

Furthermore, for example, in a case where the two Cameras 103$_4$ and 103$_5$ illustrated in FIG. 3 (for example, a stereo camera or two monocular cameras constituting a redundant system) are included as the sensors 103$_4$ and 103$_5$, the communication control unit 104 performs control to transmit the sensing data including the image data of the other camera to the information processing device 201 in a case where it is determined that one of the two cameras 103$_4$ and 103$_5$ has failed. Therefore, even if one camera that captures an image of the front of the vehicle 100 fails, the display unit 204 can display an image of the front of the vehicle 100 on the display unit 204.

Furthermore, for example, in a case where the front camera 103$_6$, the diagonally right front camera 103$_7$, and the diagonally left front camera 103$_7$ illustrated in FIG. 4 are included as the sensors 103$_6$, 103$_7$, and 103$_8$, the communication control unit 104 converts the image data of the diagonally right front camera 103$_7$ and the image data of the diagonally left front camera 103$_8$ to generate the image data of the front of the vehicle 100 in a case where it is determined that the front camera 103$_6$ has failed. Then, the control is performed to transmit the generated image data to the information processing device 201. Examples of the image data of the front of the vehicle 100 include the image data obtained by capturing an image with the front camera 103$_6$ and image data obtained by capturing an image with a virtual front camera that captures an image of the front of the vehicle 100. Thereby, even if all the cameras (including the front camera 103$_6$) that captures an image of the front of the vehicle 100 fail, an image of the front of the vehicle 100 can be displayed on the display unit 204.

Furthermore, for example, in a case where the front camera 103$_9$, the right side camera 103$_{10}$, and the left side camera 103$_{11}$ illustrated in FIG. 5 are included as the sensors 103$_9$, 103$_{10}$, and 103$_{11}$, the communication control unit 104 converts the image data of the right side camera 103$_{10}$ and the image data of the left side camera 103$_{11}$ to generate the image data of the front of the vehicle 100 in a case where it is determined that the front camera 103, has failed. Examples of the image data of the front of the vehicle 100 include the image data obtained by capturing an image with the front camera 103$_9$ and image data obtained by capturing an image with a virtual front camera that captures an image of the front of the vehicle 100. Thereby, even if all the cameras (including the front camera 103$_9$) that capture an image of the front of the vehicle 100 fail, an image of the front of the vehicle 100 can be displayed on the display unit 204.

Next, the processing proceeds to step S104, and the travel control unit 105 waits until receiving the vehicle control signal from the information processing device 201. Then, when having received the vehicle control signal, the travel control unit 105 terminates the automated driving and starts the remote driving. In the remote driving, the travel control unit 105 controls the travel of the vehicle 100 on the basis of the vehicle control signal. Thereby, the operator can perform the remote driving of the vehicle 100. Therefore, the operator (remote driver) can move the vehicle 100 to a safe place such as a roadside strip by the remote driving.

As described above, in the case where it is determined that any of the plurality of sensors 103$_1$, 103$_2$, . . . , and 103*N* has failed during automated driving, the vehicle control device 101 according to the first embodiment starts transmission of the sensing data of the sensors other than the sensor 103$_1$ determined to have failed to the information processing device 201, or starts transmission of the sensing data of the area around the vehicle 100 generated on the basis of the sensing data to the information processing device 201. Therefore, for example, even in the case where any of the plurality of sensors $103_1$, $103_2$, . . . , and $103_N$ has failed during travel control (automated driving) of the vehicle 100 based on the sensing data, it is possible to provide appropriate sensing data to the operator of the information processing device 201. Therefore, it is possible to cause the operator (remote driver) to perform the remote driving of the vehicle 100 on the basis of appropriate sensing data. Thereby, it is possible to move the vehicle 100 to a safe place such as a roadside strip by the remote driving.

2. Second Embodiment

Figure 10:
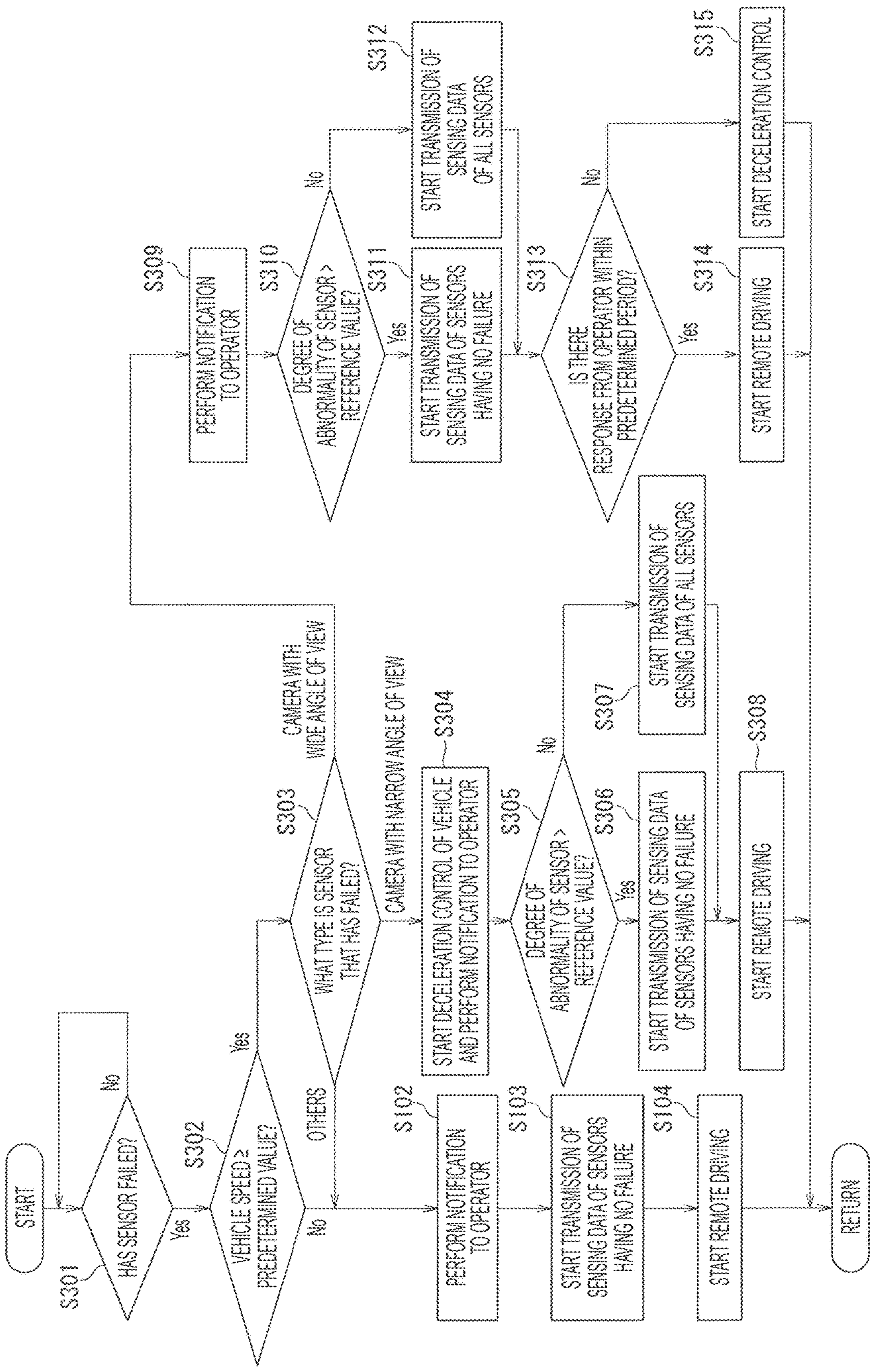
FIG. 10 is a diagram illustrating a flowchart of processing upon failure according to a second embodiment.

Next, a vehicle control system 1000, a vehicle control device 101, and a vehicle control method according to a second embodiment of the present disclosure will be described. An overall configuration of the vehicle control system 1000 according to the second embodiment is similar to that in FIG. 1, and thus illustration thereof is omitted. FIG. 10 is a diagram illustrating a flowchart of processing upon failure executed by the vehicle control device 101 according to the second embodiment. In FIG. 10, portions corresponding to those in FIG. 8 are denoted by the same reference numerals, and redundant description will be omitted.

The second embodiment is different from the first embodiment in changing sensing data to be transmitted to an information processing device 201 according to the degree of failure of a sensor $103_1$ determined to have failed in the processing upon failure. Specifically, as illustrated in FIG. 10, the processing upon failure includes steps S301 to S313 instead of step S101 illustrated in FIG. 8. Furthermore, sensors $103_1$ and $103_3$ include cameras $103_1$ and $103_3$ illustrated in FIG. 2 (front cameras having different angles of view and capturing an image of front of a vehicle 100 to generate image data). Here, the camera $103_1$ is a camera having a wider angle of view and a wider imaging range than the camera $103_3$, and thus functions as a camera that senses a vicinity. Furthermore, the camera $103_3$ is a camera having a narrower angle of view and a narrower imaging range than the camera $103_1$, but capable of capturing a far place, and thus functions as a camera that senses a far distance.

In step S301, a communication control unit 104 acquires failure determination signals transmitted from failure detection units $107_1$, $107_2$, . . . , and $107_N$. Next, it is determined whether or not any of a plurality of sensors $103_1$, $103_2$, . . . , and $103_N$ has failed on the basis of the acquired failure determination signals. Then, in a case where it is determined that any of the sensors has failed (Yes), the processing proceeds to step S302. On the other hand, in a case where it is determined that none of the sensors has failed (No), this determination is executed again.

In step S302, the communication control unit 104 determines whether or not a traveling speed of the vehicle 100 has a predetermined value (a vehicle speed determined as "high-speed traveling", for example, 80 km/h) or more. Then, in a case where it is determined that the traveling speed is the predetermined value or more (Yes), the processing proceeds to step S303. On the other hand, in a case where it is determined that the traveling speed is less than the predetermined value (No), the processing proceeds to step S102.

In step S303, the communication control unit 104 determines whether or not the sensor $103_1$ determined to have failed in step S101 among the sensors $103_1$, $103_2$, . . . , and $103_N$ is the camera $103_3$ having the narrow angle of view or the camera $103_1$ having the wide angle of view illustrated in FIG. 2, or another sensor such as the camera $103_2$. Then, in a case where it is determined that the sensor $103_1$ is the camera $103_3$ having the narrow angle of view (camera having a narrow angle of view), the processing proceeds to step S304. Furthermore, in a case where it is determined that the sensor $103_1$ is the camera $103_1$ having the wide angle of view (camera having a wide angle of view), the processing proceeds to step S309. Meanwhile, in a case where the sensor $103_1$ is another sensor (others), the processing proceeds to step S102.

In step S304, the travel control unit 105 terminates automated driving and starts deceleration control for decelerating the vehicle 100. As the deceleration control, for example, minimum risk maneuver (MRM) that automatically stops the vehicle 100 can be adopted. Next, the communication control unit 104 transmits a failure detection signal notifying that a failure has been detected to an information processing device 201 of an operation center 200 via a communication unit 102 and a network 300. Therefore, a display control unit 203 of the information processing device 201 receives the failure detection signal via the communication unit 202, and transmits a failure detection reception acknowledgment signal and a normal sensor information request signal to the communication control unit 104 that is a transmission source of the failure detection signal. The deceleration control is continued until remote driving is started.

As described above, in steps S302 to S304, in a case of determining that the traveling speed of the vehicle 100 is the predetermined value or more and the camera $103_3$ having a narrow angle of view of the two cameras $103_1$ and $103_3$ (front cameras) has failed during the automated driving, a travel control unit 105 starts the deceleration control of the vehicle 100 before transmission of sensing data to the information processing device 201. That is, the travel control unit 105 is configured to change a handover procedure of the remote driving to the information processing device 201 according to a type of the sensor determined to have failed. Here, in the automated driving at the time of high-speed traveling, the image data of the camera $103_1$ having a narrow angle of view (the camera that senses a far distance) is more important than the image data of the camera $103_3$ having a wide angle of view (the camera that senses a close distance). Therefore, in a case where there is an abnormality in the image data of high importance (the image data of the camera $103_3$ having a narrow angle of view), it is possible to terminate the automated driving (high-speed traveling), decelerate the vehicle 100, and hand over the remote driving to an operator.

Next, the processing proceeds to step S305, and the communication control unit 104 waits until receiving a normal sensor information request signal from the information processing device 201. Then, when having received the normal sensor information request signal, the communication control unit 104 determines whether or not the degree of abnormality of the sensing data of the sensor determined to have failed (the camera $103_3$ illustrated in FIG. 2) exceeds a predetermined reference. For example, it is determined whether or not a missing amount of pixels in the image indicated by the image data of the camera $103_3$ is a predetermined value (for example, 10%) or more, and in a case where it is determined that the missing amount is the predetermined value or more, it is determined that the missing amount exceeds the reference. Furthermore, for example, it is determined whether or not a missing portion of pixels in the image indicated by the image data of the camera $103_3$ is a predetermined portion (for example, a central portion of the image, a portion of a road surface of the image), and in a case where it is determined that the missing portion is the predetermined portion, it is determined that the missing portion exceeds the reference. Then, in the case where it is determined that the missing amount or the missing portion exceeds the reference (Yes), the processing proceeds to step S306. On the other hand, in the case where it is determined that the missing amount or the missing portion is the reference or less (No), the processing proceeds to step S307.

In step S306, the communication control unit 104 transmits the sensing data of the sensors $\mathbf{103}_1$, $\mathbf{103}_2$, $\mathbf{103}_4$, . . . , and $\mathbf{103}_N$ other than the sensor determined to have failed (the camera $\mathbf{103}_3$ illustrated in FIG. 2) among the sensors $\mathbf{103}_1$, $\mathbf{103}_2$, . . . , and $\mathbf{103}_N$ to the information processing device 201 of the operation center 200 via the communication unit 102 and the network 300, and then proceeds to step S308. The transmission of the sensing data is continued until the remote driving is started. That is, the communication control unit 104 performs control to transmit the sensing data including the image data of the cameras other than the camera $\mathbf{103}_3$ determined to have failed to the information processing device 201.

On the other hand, in step S307, the communication control unit 104 transmits the sensing data of all the sensors $\mathbf{103}_1$, $\mathbf{103}_2$, . . . , and $\mathbf{103}_N$ (including the camera $\mathbf{103}_3$) to the information processing device 201 of the operation center 200 via the communication unit 102 and the network 300, and then proceeds to step S308. The transmission of the sensing data is continued until the remote driving is started. That is, the communication control unit 104 performs control to transmit the sensing data including the image data of the camera $\mathbf{103}_3$ determined to have failed to the information processing device 201.

As an example of steps S305 to S307, for example, first, in step S305, the communication control unit 104 determines whether or not the missing amount of pixels in the image indicated by the image data of the camera $\mathbf{103}_3$ determined to have failed is the predetermined value (for example, 10%) or more. Then, in the case of determining that the missing amount is the predetermined value or more ("Yes" in step S305), in step S306, the communication control unit 104 performs control to transmit the sensing data not including the image data of the camera $\mathbf{103}_3$ to the information processing device 201. On the other hand, in the case of determining that the missing amount is less than the predetermined value ("No" in step S305), in step S307, the communication control unit 104 performs control to transmit the sensing data (including the image data of the camera $\mathbf{103}_3$) of all the sensors $\mathbf{103}_1$, $\mathbf{103}_2$, . . . and $\mathbf{103}_N$ to the information processing device 201. Thereby, in a case where the missing amount of the pixels is low and visibility is not degraded, the sensing data including the image data having a missing pixel is transmitted.

Furthermore, as another example, for example, first, in step S305, the communication control unit 104 determines whether or not the missing portion of pixels in the image indicated by the image data of the camera $\mathbf{103}_3$ determined to have failed is the predetermined portion. Examples of the predetermined portion include a central portion of the image or a portion of a road surface in the image. Then, in the case of determining that the missing portion is the predetermined portion ("Yes" in step S305), in step S306, the communication control unit 104 performs control to transmit the sensing data not including the image data of the camera $\mathbf{103}_3$ to the information processing device 201. On the other hand, in the case of determining that the missing portion is less than the predetermined portion ("No" in step S305), in step S307, the communication control unit 104 performs control to transmit the sensing data (including the image data of the camera $\mathbf{103}_3$) of all the sensors $\mathbf{103}_1$, $\mathbf{103}_2$, . . . and $\mathbf{103}_N$ to the information processing device 201. Thereby, in the case where the visibility is not degraded, such as a case where the missing portion of pixels is small or a case where there is no obstacle, the sensing data including the image data of a missing pixel is transmitted.

As described above, in steps S305 to S307, the communication control unit 104 is configured to change the sensing data to be transmitted to the information processing device 201 according to the degree of failure (the missing amount of pixels or the missing portion of pixels) of the sensor (camera $\mathbf{103}_3$) determined to have failed.

In step S308, and the travel control unit 105 waits until receiving a vehicle control signal from the information processing device 201. Then, when having received the vehicle control signal, the travel control unit 105 terminates the deceleration control, starts the remote driving on the basis of the vehicle control signal, and then terminates the processing upon failure. Therefore, the operator can perform the remote driving of the vehicle 100, and the operator can move the vehicle 100 to a safe place such as a roadside strip by the remote driving.

In step S309, the communication control unit 104 transmits the failure detection signal notifying that a failure has been detected to the information processing device 201 of the operation center 200 via the communication unit 102 and the network 300. Therefore, the display control unit 203 of the information processing device 201 receives the failure detection signal via the communication unit 202, and transmits the failure detection reception acknowledgment signal and the normal sensor information request signal to the communication control unit 104 that is a transmission source of the failure detection signal.

Next, the processing proceeds to step S310, and the communication control unit 104 waits until receiving a normal sensor information request signal from the information processing device 201. Then, when having received the normal sensor information request signal, the communication control unit 104 determines whether or not the degree of abnormality of the sensing data of the Sensor determined to have failed (the camera $\mathbf{103}_1$ illustrated in FIG. 2) exceeds a predetermined reference. Then, in the case where it is determined that the degree of abnormality exceeds the reference (Yes), the processing proceeds to step S311. On the other hand, in the case where it is determined that the degree of abnormality is the reference or less (No), the processing proceeds to step S312.

In step S311, the communication control unit 104 transmits the sensing data of the sensors $\mathbf{103}_2$, . . . , and 103 other than the sensor determined to have failed (the camera $\mathbf{103}_1$ illustrated in FIG. 2) among the sensors $\mathbf{103}_1$, $\mathbf{103}_2$, . . . , and $\mathbf{103}_N$ to the information processing device 201 of the operation center 200 via the communication unit 102 and the network 300, and then proceeds to step S313. The transmission of the sensing data is continued until the remote driving is started. That is, the communication control unit 104 performs control to transmit the sensing data including the image data of the cameras other than the camera $\mathbf{103}_1$ determined to have failed to the information processing device 201.

On the other hand, in step S312, the communication control unit 104 transmits the sensing data of all the sensors $\mathbf{103}_1$, $\mathbf{103}_2$, . . . , and $\mathbf{103}_N$ (including the camera $\mathbf{103}_1$) to the information processing device 201 of the operation center 200 via the communication unit 102 and the network 300, and then proceeds to step S313. The transmission of the sensing data is continued until the remote driving is started. That is, the communication control unit 104 performs control to transmit the sensing data including the image data of the camera $103_1$ determined to have failed to the information processing device 201.

In step S313, after transmitting the sensing data to the information processing device 201, the communication control unit 104 determines whether or not a response indicating the start of the remote driving has been received from the information processing device 201 within a predetermined period (for example, 10 seconds). As the response indicating the start of the remote driving, for example, a signal for notifying the start of the remote driving and the vehicle control signal can be adopted. An example of the signal for notifying the start of the remote driving includes a signal transmitted from the information processing device 201 when the operator presses a button for switching the automated driving to the remote driving. Then, in a case where the communication control unit 104 determines that the response has been received (Yes), the processing proceeds to step S314. On the other hand, in a case where it is determined that the response has not been received (No), the processing proceeds to step S315.

In step S314, and the travel control unit 105 waits until receiving the vehicle control signal from the information processing device 201. Then, when having received the vehicle control signal, the travel control unit 105 terminates the automated driving, starts the remote driving on the basis of the vehicle control signal, and then terminates the processing upon failure. Therefore, the operator can perform the remote driving of the vehicle 100, and the operator can move the vehicle 100 to a safe place such as a roadside strip by the remote driving.

As described above, in steps S301 to S303 and S314, in the case of determining that the traveling speed of the vehicle 100 is the predetermined value or more and the camera $103_1$ having the wide angle of view of the two cameras $103_3$ and $103_1$ (front cameras) has failed during the automated driving, the travel control unit 105 maintains the automated driving until the remote driving is started. That is, the travel control unit 105 is configured to change the handover procedure of the remote driving to the information processing device 201 according to the type of the sensor determined to have failed. Here, in the automated driving at the time of high-speed traveling, the image data of the camera $103_1$ having the narrow angle of view (the camera that senses a far distance) is more important than the image data of the camera $103_3$ having the wide angle of view (the camera that senses a close distance). Therefore, in a case where there is no abnormality in the image data of high importance (the image data of the camera $103_3$ having the narrow angle of view), it is possible to continue the automated driving (high-speed traveling) and hand over the remote driving to the operator.

On the other hand, in step S315, the travel control unit 105 starts the deceleration control (for example, MRM) for decelerating the vehicle 100, and then terminates the processing upon failure. Thereby, for example, when the operator cannot operate the remote operation unit 205 and a predetermined period has elapsed without starting the remote driving, the vehicle deceleration control can be started to decelerate and stop the vehicle 100.

Note that, the present technology may also have the following configuration.

(1)

A vehicle control device including:

a plurality of sensors mounted on a vehicle and configured to sense an area around the vehicle to generate sensing data;

a travel control unit mounted on the vehicle and configured to selectively execute automated driving that controls travel of the vehicle on a basis of the sensing data of the plurality of sensors and remote driving that controls travel of the vehicle on a basis of operation information related to the remote driving of the vehicle transmitted from an external device; and a communication control unit mounted on the vehicle, and configured to, in a case where it is determined that any of the plurality of sensors has failed during the automated driving, start transmission of the sensing data of the sensor other than the sensor determined to have failed to the external device, or start transmission of sensing data of the area around the vehicle generated on a basis of the sensing data to the external device.

(2)

The vehicle control device according to (1), in which the plurality of sensors includes two or more cameras having different angles of view and which capture images in a same direction to generate image data, imaging ranges of the two or more cameras partially overlap each other, and the communication control unit performs control to transmit, to the external device, the sensing data including the image data of the remaining camera in a case where it is determined that any one of the two or more cameras has failed during the automated driving.

(3)

The vehicle control device according to (1), in which the plurality of sensors includes two cameras having a same angle of view and which capture images in a same direction to generate image data, imaging ranges of the two cameras partially overlap each other, and the communication control unit performs control to transmit, to the external device, the sensing data including the image data of the other camera in a case where it is determined that one of the two cameras has failed during the automated driving.

(4)

The vehicle control device according to (1), in which the plurality of sensors includes a front camera that captures an image of front of the vehicle to generate image data, a diagonally right front camera that captures an image of diagonally right front of the vehicle to generate image data, and a diagonally left front camera that captures an image of diagonally left front of the vehicle to generate image data, imaging ranges of the diagonally right front camera and the diagonally left front camera partially overlap an imaging range of the front camera, and the communication control unit performs control to convert the image data of the diagonally right front camera and the image data of the diagonally left front camera to generate image data of the front of the vehicle and transmit the generated image data to the external device in a case where it is determined that the front camera has failed during the automated driving.

(5)

The vehicle control device according to (1), in which the plurality of sensors includes a front camera that captures an image of front of the vehicle to generate image data, a right side camera that captures an image of a right side of the vehicle to generate image data, and a left side camera that captures an image of a left side of the vehicle to generate image data, imaging ranges of the right side camera and the left side camera partially overlap an imaging range of the front camera, and the communication control unit performs control to convert the image data of the right side camera and the image data of the left side camera to generate image data of the front of the vehicle and transmit the generated image data to the external device in a case where it is determined that the front camera has failed during the automated driving.

(6)

The vehicle control device according to any one of (1) to (5), in which the communication control unit changes the sensing data to be transmitted to the external device according to a degree of failure of the sensor determined to have failed.

(7)

The vehicle control device according to (6), in which the plurality of sensors includes a camera that captures an image of an area around the vehicle to generate image data, and the communication control unit determines whether or not a missing amount of a pixel in the image indicated by the image data of the camera is a predetermined value or more in a case where it is determined that the camera has failed during the automated driving, performs control to transmit the sensing data not including the image data of the camera to the external device in a case where it is determined that the missing amount is the predetermined value or more, and performs control to transmit the sensing data including the image data of the camera to the external device in a case where it is determined that the missing amount is less than the predetermined value.

(8)

The vehicle control device according to (6), in which the plurality of sensors includes a camera that captures an image of an area around the vehicle to generate image data, and the communication control unit determines whether or not a missing portion of a pixel in the image indicated by the image data of the camera is a predetermined portion in a case where it is determined that the camera has failed during the automated driving, performs control to transmit the sensing data not including the image data of the camera to the external device in a case where it is determined that the missing portion is the predetermined portion, and performs control to transmit the sensing data including the image data of the camera to the external device in a case where it is determined that the missing portion is not the predetermined portion.

(9)

The vehicle control device according to (8), in which the predetermined portion is a central portion of the image or a portion of a road surface in the image.

(10)

The vehicle control device according to any one of (1) to (9), in which the travel control unit changes a handover procedure of the remote driving to the external device according to a type of the sensor determined to have failed.

(11)

The vehicle control device according to (10), in which the plurality of sensors includes two front cameras having different angles of view and which capture images of front of the vehicle to generate image data, and the travel control unit terminates the automated driving and starts deceleration control of the vehicle before the transmission of the sensing data to the external device is started in a case where it is determined that a traveling speed of the vehicle is a predetermined value or more and the front camera having a wide angle of view of the two front cameras has failed during the automated driving.

(12)

The vehicle control device according to (11), in which the travel control unit maintains the automated driving until the remote driving is started in a case where it is determined that the traveling speed of the vehicle is a predetermined value or more and the front camera having a narrow angle of view of the two front cameras has failed during the automated driving.

(13)

The vehicle control device according to any one of (1) to (12), in which the communication control unit determines whether or not a response indicating start of the remote driving has been received from the external device within a predetermined time after the transmission of the sensing data to the external device, and the travel control unit starts the remote driving on a basis of the operation information transmitted from the external device in a case where it is determined that the response has been received within the predetermined time, and starts deceleration control of the vehicle in a case where it is determined that the response has not been received.

(14)

A vehicle control system including:

a vehicle control device mounted on a vehicle; and an external device disposed outside the vehicle, the vehicle control device including a plurality of sensors configured to sense an area around the vehicle to generate sensing data, a travel control unit configured to selectively execute automated driving that controls travel of the vehicle on a basis of the sensing data of the plurality of sensors and remote driving that controls travel of the vehicle on a basis of operation information related to the remote driving of the vehicle transmitted from the external device, and a communication control unit configured to, in a case where it is determined that any of the plurality of sensors has failed during the automated driving, start transmission of the sensing data of the sensor other than the sensor determined to have failed to the external device, or start transmission of sensing data of the area around the vehicle generated on a basis of the sensing data to the external device, and the external device including a display unit configured to display a sensing result indicated by the sensing data, and a remote operation unit configured to receive an operation by a remote driver, generate the operation information according to the received operation, and transmit the operation information to the external device.

(15)

A vehicle control method including:

selectively executing automated driving that controls travel of a vehicle on a basis of sensing data generated by a plurality of sensors mounted on the vehicle or remote driving that controls travel of the vehicle on a basis of operation information related to the remote driving of the vehicle transmitted from an external device; and in a case where it is determined that any of the plurality of sensors has failed during the automated driving, starting transmission of the sensing data of the sensor other than the sensor determined to have failed to the external device, or starting transmission of sensing data of the area around the vehicle generated on a basis of the sensing data to the external device.

REFERENCE SIGNS LIST

100 Vehicle
101 Vehicle control device
102 Communication unit
$103_1$ to $103_N$ Sensor
104 Communication control unit
105 Travel control unit
$106_1$ to $106_{11}$ Imaging range
$107_1$ to $107_N$ Failure detection unit
150 Processor
151 ROM
152 RAM
153 Recording medium
154 Bus
200 Operation center
201 Information processing device
202 Communication unit
203 Display control unit
204 Display unit
205 Remote operation unit
300 Network
1000 Vehicle control system

The invention claimed is:

1. A vehicle control device comprising:

a plurality of sensors mounted on a vehicle and configured to sense an area around the vehicle to generate sensing data;

a travel control unit mounted on the vehicle and configured to selectively execute automated driving that controls travel of the vehicle on a basis of the sensing data of the plurality of sensors and remote driving that controls travel of the vehicle on a basis of operation information related to the remote driving of the vehicle transmitted from an external device; and a communication control unit mounted on the vehicle, and configured to, in a case where it is determined that any of the plurality of sensors has failed during the automated driving, start transmission of the sensing data of the sensor other than the sensor determined to have failed to the external device, or start transmission of sensing data of the area around the vehicle generated on a basis of the sensing data to the external device.

2. The vehicle control device according to claim 1, wherein the plurality of sensors includes two or more cameras having different angles of view and which capture images in a same direction to generate image data, imaging ranges of the two or more cameras partially overlap each other, and the communication control unit performs control to transmit, to the external device, the sensing data including the image data of the remaining camera in a case where it is determined that any one of the two or more cameras has failed during the automated driving.

3. The vehicle control device according to claim 1, wherein the plurality of sensors includes two cameras having a same angle of view and which capture images in a same direction to generate image data, imaging ranges of the two cameras partially overlap each other, and the communication control unit performs control to transmit, to the external device, the sensing data including the image data of the other camera in a case where it is determined that one of the two cameras has failed during the automated driving.

4. The vehicle control device according to claim 1, wherein the plurality of sensors includes a front camera that captures an image of front of the vehicle to generate image data, a diagonally right front camera that captures an image of diagonally right front of the vehicle to generate image data, and a diagonally left front camera that captures an image of diagonally left front of the vehicle to generate image data, imaging ranges of the diagonally right front camera and the diagonally left front camera partially overlap an imaging range of the front camera, and the communication control unit performs control to convert the image data of the diagonally right front camera and the image data of the diagonally left front camera to generate image data of the front of the vehicle and transmit the generated image data to the external device in a case where it is determined that the front camera has failed during the automated driving.

5. The vehicle control device according to claim 1, wherein the plurality of sensors includes a front camera that captures an image of front of the vehicle to generate image data, a right side camera that captures an image of a right side of the vehicle to generate image data, and a left side camera that captures an image of a left side of the vehicle to generate image data, imaging ranges of the right side camera and the left side camera partially overlap an imaging range of the front camera, and the communication control unit performs control to convert the image data of the right side camera and the image data of the left side camera to generate image data of the front of the vehicle and transmit the generated image data to the external device in a case where it is determined that the front camera has failed during the automated driving.

6. The vehicle control device according to claim 1, wherein the communication control unit changes the sensing data to be transmitted to the external device according to a degree of failure of the sensor determined to have failed.

7. The vehicle control device according to claim 6, wherein the plurality of sensors includes a camera that captures an image of an area around the vehicle to generate image data, and the communication control unit determines whether or not a missing amount of a pixel in the image indicated by the image data of the camera is a predetermined value or more in a case where it is determined that the camera has failed during the automated driving, performs control to transmit the sensing data not including the image data of the camera to the external device in a case where it is determined that the missing amount is the predetermined value or more, and performs control to transmit the sensing data including the image data of the camera to the external device in a case where it is determined that the missing amount is less than the predetermined value.

8. The vehicle control device according to claim 6, wherein the plurality of sensors includes a camera that captures an image of an area around the vehicle to generate image data, and the communication control unit determines whether or not a missing portion of a pixel in the image indicated by the image data of the camera is a predetermined portion in a case where it is determined that the camera has failed during the automated driving, performs control to transmit the sensing data not including the image data of the camera to the external device in a case where it is determined that the missing portion is the predetermined portion, and performs control to transmit the sensing data including the image data of the camera to the external device in a case where it is determined that the missing portion is not the predetermined portion.

9. The vehicle control device according to claim 8, wherein the predetermined portion is a central portion of the image or a portion of a road surface in the image.

10. The vehicle control device according to claim 1, wherein the travel control unit changes a handover procedure of the remote driving to the external device according to a type of the sensor determined to have failed.

11. The vehicle control device according to claim 10, wherein the plurality of sensors includes two front cameras having different angles of view and which capture images of front of the vehicle to generate image data, and the travel control unit terminates the automated driving and starts deceleration control of the vehicle before the transmission of the sensing data to the external device is started in a case where it is determined that a traveling speed of the vehicle is a predetermined value or more and the front camera having a wide angle of view of the two front cameras has failed during the automated driving.

12. The vehicle control device according to claim 11, wherein the travel control unit maintains the automated driving until the remote driving is started in a case where it is determined that the traveling speed of the vehicle is a predetermined value or more and the front camera having a narrow angle of view of the two front cameras has failed during the automated driving.

13. The vehicle control device according to claim 1, wherein the communication control unit determines whether or not a response indicating start of the remote driving has been received from the external device within a predetermined time after the transmission of the sensing data to the external device, and the travel control unit starts the remote driving on a basis of the operation information transmitted from the external device in a case where it is determined that the response has been received within the predetermined time, and starts deceleration control of the vehicle in a case where it is determined that the response has not been received.

14. A vehicle control system comprising:

a vehicle control device mounted on a vehicle; and an external device disposed outside the vehicle, the vehicle control device including a plurality of sensors configured to sense an area around the vehicle to generate sensing data, a travel control unit configured to selectively execute automated driving that controls travel of the vehicle on a basis of the sensing data of the plurality of sensors and remote driving that controls travel of the vehicle on a basis of operation information related to the remote driving of the vehicle transmitted from the external device, and a communication control unit configured to, in a case where it is determined that any of the plurality of sensors has failed during the automated driving, start transmission of the sensing data of the sensor other than the sensor determined to have failed to the external device, or start transmission of sensing data of the area around the vehicle generated on a basis of the sensing data to the external device, and the external device including a display unit configured to display a sensing result indicated by the sensing data, and a remote operation unit configured to receive an operation by a remote driver, generate the operation information according to the received operation, and transmit the operation information to the external device.

15. A vehicle control method comprising:

selectively executing automated driving that controls travel of a vehicle on a basis of sensing data generated by a plurality of sensors mounted on the vehicle, and remote driving that controls travel of the vehicle on a basis of operation information related to the remote driving of the vehicle transmitted from an external device; and in a case where it is determined that any of the plurality of sensors has failed during the automated driving, starting transmission of the sensing data of the sensor other than the sensor determined to have failed to the external device, or starting transmission of sensing data of the area around the vehicle generated on a basis of the sensing data to the external device.

* * * * *